(12) United States Patent
Neumeyer et al.

(10) Patent No.: US 6,760,697 B1
(45) Date of Patent: Jul. 6, 2004

(54) CENTRALIZED PROCESSING OF DIGITAL SPEECH DATA ORIGINATED AT THE NETWORK CLIENTS OF A SET OF SERVERS

(75) Inventors: Leonardo Neumeyer, Palo Alto, CA (US); Dimitry Rtischev, Menlo Park, CA (US); Diego Doval, Mountain View, CA (US); Juan Gargiulo, Mountain View, CA (US)

(73) Assignee: Minds and Technology, Inc., Palo Alto, CA (US)

( * ) Notice: Subject to any disclaimer, the term of this patent is extended or adjusted under 35 U.S.C. 154(b) by 0 days.

(21) Appl. No.: 09/535,061

(22) Filed: Mar. 23, 2000

Related U.S. Application Data

(60) Provisional application No. 60/178,072, filed on Jan. 25, 2000.

(51) Int. Cl.[7] .............................................. G10L 19/00
(52) U.S. Cl. .................... 704/201; 704/270; 704/270.1; 704/275
(58) Field of Search ............................. 704/270.1, 270, 704/275, 231, 251, 201; 379/142.04, 142.07

(56) References Cited

U.S. PATENT DOCUMENTS

| | | | | |
|---|---|---|---|---|
| 6,144,848 A | * | 11/2000 | Walsh et al. | ................. 235/379 |
| 6,157,705 A | * | 12/2000 | Perrone | .................... 379/88.01 |
| 6,163,794 A | * | 12/2000 | Lange et al. | ................. 709/202 |
| 6,185,535 B1 | * | 2/2001 | Hedin et al. | ................. 704/270 |
| 6,192,338 B1 | * | 2/2001 | Haszto et al. | ................ 704/257 |
| 6,269,336 B1 | * | 7/2001 | Ladd et al. | .............. 379/88.13 |
| 6,292,782 B1 | * | 9/2001 | Weideman | ................... 704/273 |

FOREIGN PATENT DOCUMENTS

| | | |
|---|---|---|
| EP | 0 843 454 A2 | 5/1998 |
| WO | WO 98/23062 | 5/1998 |
| WO | WO 99/08084 | 2/1999 |

OTHER PUBLICATIONS

Tu et al, "Speech Recognition Over the Internet Using Java," 1999. IEEE, pp2367–2370.*
Zhemin Tu, et al., Speech Recognition Over the Internet Using Java, 1999, IEEE, pp. 2637–2370, XP002164874.
Marc A. Zissman, Comparison of Four Approaches to Automatic Language Identification of Telephone Speech, 1996, IEEE, pp. 31–44, XP002164875.

* cited by examiner

*Primary Examiner*—Vijay Chawan
*Assistant Examiner*—Michael N. Opsasnick
(74) *Attorney, Agent, or Firm*—Marcel K. Bingham; Hickman Palermo Truong & Becker LLP

(57) ABSTRACT

Described herein is a system that enables service provider's to integrate speech functionality into their applications. A service provider maintains a set of application servers. To provide a particular speech service to a client of the application server, the application server causes the client to request the speech service from another set of servers. This set of servers is responsible for providing this speech service as well as others. Such speech services include recording digital speech data at the client, and storing the recordings. Later, the application servers may retrieve the recordings, and even more, retrieve data derived from the recordings, such as data generated through speech recognition processes.

44 Claims, 3 Drawing Sheets

CENTRALIZED PROCESSING OF DIGITAL SPEECH DATA ORIGINATED AT THE NETWORK CLIENTS OF A SET OF SERVERS

RELATED APPLICATION

This patent application claims priority from U.S. Provisional Patent Application No. 60/178,072, filed on Jan. 25, 2000, entitled, "Asynchronous Distributed Voice Communication Over the Internet, by Leonardo Neumeyer, et al.

FIELD OF THE INVENTION

The present invention relates to analysis, processing, transmission, and storage of digital speech data recorded at the network clients of a set of servers.

BACKGROUND OF THE INVENTION

Use of Internet technologies to interact with customers of enterprises is proliferating. Enterprises are taking advantage of increasing use by consumers of the global, packet-switched network known as the Internet. Through the internet consumers may not only obtain information about goods and service, but may order the goods or services themselves.

To interact with their customers, an enterprise uses a server that is connected to the World Wide Web ("Web"). The World Wide Web includes a network of servers on the Internet. The servers communicate by using the Hypertext Transfer Protocol (HTTP) with clients that are under the control of users, and deliver files referred to as "pages" to the clients. The files typically contain code written in the Hypertext Markup Language (HTML). The page may define a user interface, which is typically a graphical user interface ("GUI").

The pages are delivered to clients that request them. Typically, a client retrieves a page using a computer device that runs a client program, referred to as a browser. A browser is a combination of software and hardware that is capable of using the HTTP protocol to retrieve data from a server connected to the Web. When a browser running on a client receives a page containing code that conforms to HTML, the browser decodes it. The HTML code may define a graphical user interface. Thus, when a browser decodes a page, it generates the GUI. The user interacts with the GUI to enter data, such as text data entered through a keyboard, which the client transmits back to the server.

An organization that operates a server on the Web for the purpose of delivering user interfaces through which customers or constituents of an enterprise may interact with the enterprise, is herein referred to as a service provider. A service provider may be an internal organization of an enterprise (e.g. an information systems department), or an external organization, typically hired by the enterprise.

A graphical user interface often includes a display that may contain text, graphical controls (e.g. selection buttons, command buttons, labels), and commands for displaying content defined by other files or sources of data, such as graphical image files or other pages containing HTML code. Thus, HTML code includes commands for displaying content defined by other pages and sources of data. Such commands specify a location ("link") of a source of data (e.g. file, or a server that generates a stream of data).

Most clients and browsers are configured to generate input and output in forms of media other than graphical. Thus, user interfaces generated by a browser are not limited to interacting with users through a mouse or a keyboard. For example, browsers may retrieve digital speech data over the Web from a server. When the digital speech data is received, the client decodes the digital speech data and generates sound. Specifically, a browser under the control of a user may download a page from a server of a service provider. The HTML code in the page may define commands and links for pictures, and, in association with the pictures, (1) a label, and (2) commands and links to retrieve and play digital speech clips. Each picture depicts a product offered by the enterprise associated with the service provider. When HTML code is decoded by a browser, it generates in its display a picture and label adjacent to the picture. The label may be clicked by a user using a mouse. In response to clicking the label, the browser connects to the source of the sound associated with the picture, and begins to receive digital speech data. In response to receiving digital speech data, the client generates sound, and in particular, music and a narrative advertising the product.

Transmission of information between users and service providers is not a one way process, users also may transmit information to the service providers. For example, a user may download a page that defines a graphical user interface for ordering products. The user enters date for the order through the interface. The entry of order may include typing in information, such as an address and credit card number, which is collected by browser, and eventually transmitted to the service provider.

Many clients are capable of receiving digital speech input from a user. Thus, an interface downloaded by a browser may not be configured just to convey speech to a user, but to receive voice input from the user. The voice input received from the user is converted into digital speech data, which is transmitted by the browser to a service provider. The ability to both convey and receive speech input from the user provides a method of communication that may be more effective and convenient in many cases.

For example, a service provider sells books using the Web. Customers may download pages that each describe a book which may be purchased from the service provider. The display generated for a particular page contains the following: (1) text describing the book, (2) a command button ("narrative button") associated with a narrative from the author, (3) a set of command buttons ("reader comment buttons") associated with sound clips left by various readers of the books, and (4) a command button ("leave comment button") for leaving a verbal comment about the book. When the user clicks the command button, the client retrieves digital speech data for playing the narrative from a server of the service provider, and then plays it back to the user. The user then hears a description of the book in the authors own voice. When the user clicks one of the reader comment buttons, the client retrieves digital speech data for playing a comment left by a reader of the book. The user hears the comment in the reader's own voice, hearing not only the words, but the emotion behind them. Emotion is a concept not easily conveyed in writing for mainstream users.

When the user clicks on the leave comment button, the client prompts the user to provide voice input, which the client records. The client transmits digital speech data of the recording to the service provider's server. Voice input is a method of providing input that is more effective and convenient for many users.

However, receiving voice input is not as necessarily convenient for a service provider. Managing speech input and data requires capabilities in addition to capabilities normally needed to process more traditional forms of user entered data, such as ASCII text data entered through a GUI. These capabilities require use of other technologies and personnel skilled in those technologies to support the technologies. For example, receiving speech input requires techniques for automatically controlling gain (recorded volume of a speaker's voice), compressing speech data, reliable transmission of digital speech data over the Internet, and caching digital speech data transmitted between the client and the server. When the digital speech data is received, it may be stored and further processed. For example, once a server receives digital speech data, the server may apply speech recognition processes to generate, for example, keywords. A database may be needed to manage information used to manage the digital speech data, information that may be extracted from the digital speech data using speech recognition technology.

Voice processing technology also enables service providers to obtain forms of information not easily obtained from traditional forms of user entered data. For example, anger detection methods may be used to detect anger in digital speech data generated by a customer. Digital speech data may also be used to authenticate a user.

Employing digital speech processing technology requires additional resources to support the technology. Software must be purchased, developed, and maintained. Personnel that are experts in the technology must be hired. The cost of acquiring the resources are often so high that the implementation of digital speech processing technology is uneconomical.

Based on the foregoing, it is clearly desirable to provide a system that lessens the cost associated with processing digital speech data originated from a client on the Internet.

SUMMARY OF THE INVENTION

Described herein is a system that enables service provider's to integrate speech functionality into their applications. A service provider maintains a set of application servers. To provide a particular speech service to a client of the application server, the application server causes the client to request the speech service from another set of servers. This set of servers is responsible for providing this speech service as well as others. Such speech services include recording digital speech data at the client, and storing the recordings. Later, the application servers may retrieve the recordings, and even more, retrieve data derived from the recordings, such as data generated through speech recognition processes.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for managing the distribution of client-originated digital speech data is described. In the following description, for the purposes of explanation, numerous specific details are set forth in order to provide a thorough understanding of the present invention. It will be apparent, however, to one skilled in the art the present invention may be practiced without these specific details. In other instances, well-known structures and devices are shown in block diagram form in order to avoid unnecessarily obscuring the present invention.

The system described may be used to facilitate the integration of speech functionality into Internet applications. Service providers may "speech enable" their web applications with minimal engineering effort, cost, and time. Using the system described herein, it is possible for a service provider to add speech functionality, such as voice chat, by simply adding a few lines of code to their Internet applications.

Figure 1:
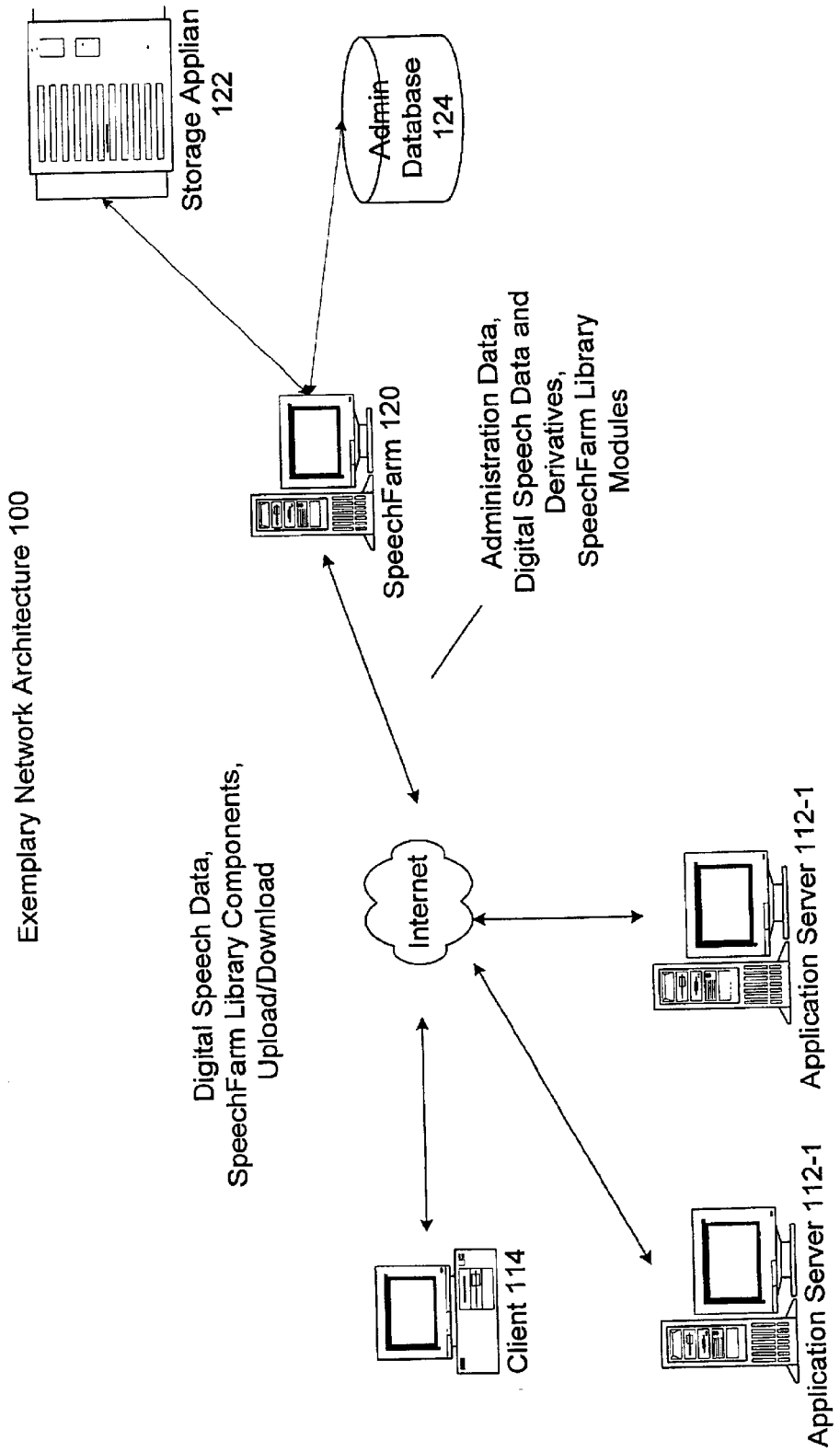
FIG. 1 is an exemplary network architecture upon which an embodiment of the present invention may be implemented.

FIG. 1 is a block diagram depicting an exemplary network architecture 100 according to an embodiment of the present invention. Referring to FIG. 1, application servers 112 host applications for service providers. Each of application servers 112 is coupled to SpeechFarm 120 and a client, such as client 114, over a network, such as the Internet. Application servers 112 integrate speech functionality available on SpeechFarm 120. For example, application server 112-1 transmits pages to client 114. Speech functionality from SpeechFarm 120 may be integrated by embedding a few lines of HTML code. Application servers 112 also communicate directly to the SpeechFarm server to handle administrative tasks and to retrieve data.

SpeechFarm 120 is a server that provides speech services to application servers 112 and clients of application servers 112. A speech service may be (1) the processing of digital speech data recorded at a client, or (2) the delivery of software that when executed, operates on digital speech data. The digital speech services provided by SpeechFarm 120 may be used to analyze, transmit, and store digital speech data. In addition, SpeechFarm 120 may provide speech services that generate derivatives from speech data, such as translating digital speech data into data representing words ("word data", e.g. ASCII text). In addition, SpeechFarm 120 may provide speech services for further analyzing, storing, and transmitting the derivatives. An expository list of speech services is described later.

SpeechFarm 120 includes an administrative database 124 and storage appliance 122 (e.g. disk drive). Administrative database 124 is used to store information regarding the administration of speech services provided by SpeechFarm 120. Storage appliance 122 is used to store digital speech data, its derivatives, and modules of software downloaded to client 114 or application servers 112 for execution. For example, storage appliance 122 may contain files of digital speech data of users recorded at client 114 and other clients. Administrative database 124 may be a relational database that includes records that hold information about each file holding digital speech data stored on storage appliance 122.

Many speech services supplied by SpeechFarm 120 operate upon digital speech data received from a client, such as client 114, and stored on SpeechFarm 120. Digital speech data that SpeechFarm 120 receives from the client of an application server and stores on SpeechFarm 120 is herein referred to as a speech recording.

Application servers 112 execute applications on behalf of one or more service providers. Application servers 112 will usually be designed, implemented, and operated by independent service providers with little or no expertise in speech technologies. These applications may integrate speech functionality-through the use of speech services available on SpeechFarm 120. For example, to record speech at web client 114, application server 112 causes client 114 to connect to SpeechFarm 120. Once connected, SpeechServices 120 provides a speech recording service to the client. Specifically, application server 112-1 downloads a page file to web client 114. The page may contain code (e.g. HTML or Java) that causes web client 114 to connect to the SpeechFarm 120 to retrieve additional software for execution (e.g. HTML or Java) on web client 114. Web client 114 retrieves the software and executes it, recording digital speech of user and transmitting it to SpeechFarm 120.

Client 114 is a combination of hardware and software that hosts the presentation layer of applications provided by Application 112 and SpeechFarm 120. For example, Client 114 may be a web client running a browser that downloads software from application server 112-1 and SpeechFarm 120. As previously illustrated, software downloaded from SpeechFarm 120 may be executed by client 114 to support speech services. Software that is down-loaded to a client of an application server and that is executed to support the delivery of a speech service is referred to herein as SpeechFarm library modules. For example, the Speech Form library modules may be Java™ applets which may be downloaded and executed by a browser to support (1) record and playback, (2) encoding and decoding, (3) up-streaming and down-streaming, (4) automated gain control, (5) estimation of signal-to-noise levels, (6) client-side caching, (7) and transmission to and from SpeechFarm 120 using reliable protocols.

Expository List of Speech Services

The following list is a non-exclusive list of speech services and applications made available by SpeechFarm 120, according to one embodiment. The speech services made available by SpeechFarm 120 are not limited to those described below.

Asynchronous spoken communication. Voice messages (i.e. speech recordings generated by individuals to communicate with individual) are recorded and played back at clients of an application server. The application server manages the flow of voices message between web clients.

Collection and storage of speech data. Storage of speech recordings created at a web client on a remote server.

Human-computer dialogs using speech recognition. Speech recognition applications use the web client to record speech, generate digital speech data, and transmit it to SpeechFarm 120. The SpeechFarm 120 converts the digital speech into data word data or a finite set of decision units. The SpeechFarm 120 returns the results of the conversions (e.g. word data) to the client 114 or the application server 112.

Speaker veriflcation. Identification and verification of the person who produced the speech data. Techniques for speaker verification are described in: 1) H. Gish, M. Schmidt, "Text-independent Speaker Identification", IEEE Signal Processing Magazine, pp. 18–32, October, 1994, herein incorporated by reference; 2) D. A. Reynolds, "Robust Text-independent Speaker Identification Using Gaussian Mixture Speaker Models", IEEE Trans. Acoustic, Speech, Signal Processing, Vol. 3, No. 1, January 1995, herein incorporated by reference; 3) M. Sokolov, "Speaker Verification on the World Wide Web", Proc. of Eurospeech, 1997, Rhodes, Greece, herein incorporated by reference.

Pronunciation evaluation. Production of a measure that correlates with pronunciation quality. Techniques for pronunciation evaluation are described in: 1) S. Anderson, and D. Kewely-Port, "Evaluation of Speech Recognizers for Speech Training Applications", IEEE Trans. SAP, Vol. 3, No. 4, pp. 229–241; 2) S. Anderson and D. Kewely-Port, "Evaluation of Speech Recognizers for Speech Training Applications", IEEE Trans. SAP, Vol. 3, No 4, 229–241; 3) C. Cucchiarini, H. Strik, and L Boves, "Automatic Pronunciation Grading for Dutch", Proc. of the ESCA Workshop on Speech Technology in Language Learning 1998, Sweden; 4) J. Bernstein, M. Cohen, H. Murveit, D. Rtischev, and M. Weintraub, "Automatic Evaluation and Training in English Pronunciation", Proc. Intl. Conf. on Spoken Language Processing 1990, Kobe, Japan; 5) L. Neumeyer, H. Franco, M. Weintraub, and P. Price, "Automatic Text-Independent Pronunciation Scoring of Foreign Language Student Speech". Proc. Intl. Conf. on Spoken Language Processing 1996, Philadelphia, Pa.; 6) S. M. Witt, and S. J. Young, "Performance Measures for Phone-Level Pronunciation Teaching in CALL", Proceedings of the ESCA Workshop on Speech Technology in Language Learning, 1998, Sweden.

Gender/Age/Language identification. Detection of gender, age, and language of the speaker. Techniques used for detecting gender, age, and language identification are discussed in: M. A. Zissman, "Comparison of Four Approaches to Automatic Language Identification of Telephone Speech", IEEE Trans. Speech and Audio Proc., SAP-4, January 1996.

Keyword Spotting. Detection of speech segments that closely match the pattern of a set of keywords. Techniques used for keyword spotting are discussed in: 1) Rohlicek, et al., "Continuous Hidden Markov Modeling for Speaker-Independent Word Spotting," Intl. Conf. on Acoustics, Speech, and Signal Processing 1989; 2) R. Rose et al., "A Hidden Markov Model Based Keyword Recognition System," Intl. Conf on Acoustics, Speech, and Signal Processing 1990; 3) S. J. Young, J. T. Foote, G. J. F. Jones, K. S. Jones, and M. G. Brown, "Acoustic Indexing for Multimedia Retrieval and Browsing", Intl. Conf. on Acoustics, Speech, and Signal Processing 1997; 4) M. Weintraub, "Keyword-Spotting using SRI's DECIPHER Large-Vocabulary Speech-Recognition System," Intl. Conf. on Acoustics, Speech, and Signal Processing 1993; 5) M. Weintraub, "LVCSR Log-Likelihood Ratio Scoring For Keyword Spotting" Intl. Conf. on Acoustics, Speech, and Signal Processing 1995.

Anger Detection. Detection of speech segments for which the speaker appears to be emotionally upset. Techniques used for anger detection are discussed in: C. Pereira, and C. Watson, "Some Acoustic Characteristics Of Emotion", Proc. Intl. Conf. on Spoken Language Processing 1998, Sydney, Australia.

Adult language detection. Detection of speech segments that appear to contain adult language.

Language learning. Asynchronous spoken communication, human-computer dialogs using speech recognition and pronunciation evaluation functionality used to build language learning services. See U.S. patent application Ser. No. 09/473550, "Method and Apparatus for Fluency Training for Spoken Human Languages", by Dimitry Rtischev, Philip Hubbard, Leonardo Neumeyer, and Kaori Shibatani Distributed asynchronous processing of speech data by human agents. For example transcription of speech data or, customer support inquiry processing.

Benefits of SpeechFarm

Use of SpeechFarm 120 facilitates integration of speech functionality into web application for analysis, processing, transmission, and storage of digital speech data. The browsers connected to the World Wide Web may be empowered, extended to acquire speech data via a personal computer and upload the data to a server.

Speech services used by service providers may be centralized and shared. Thus, the cost of resources needed to operate speech services may be distributed among multiple service providers. For a particular service provider, sharing expenditures lessens the cost speech technology, making this technology economical to implement. For example, new software incorporating new and improved speech technologies, and the staff needed to support their procurement and maintenance, may by obtained more cheaply. Speech recognition and language translation specialists become affordable. Because the SpeechFarm Modules are centrally located, they can be managed by a single staff dedicated and expert in providing speech technology and science.

The SpeechFarm offers many advantages over the existing speech technology. For example:

1. Personal computer products such as dictation speech recognition software from Dragon Systems that require the end-user to install, maintain, and upgrade large programs on a personal computer.
2. Telephony products such as the speech recognition engine from Nuance Communications that require the service provider to install, maintain, and upgrade large programs on their server.
3. Telephony products such as Voyager from Nuance Communications enable voice browsing capabilities over the existing public switched telephone network. The voice web enhances the telephony network by opening new channels for content providers. Voyager, however, does not address the problem of enabling application services over the Internet as SpeechFarm does.
4. Internet products such as that from PageTalk.com that require end-users to record speech via the telephone and play back speech using Internet streaming technology such as the RealAudio plugin. Unlike SpeechFarm, the PageTalk.com service requires a telephone for recording. This limits its use to mostly static pages, it does not provide administrative services and does not provide backend processing of the recorded speech.
5. Combined Internet and telephony products such as that from Onebox.com that include voice recording and playback via a web browser. Onebox.com maybe used as a messaging service provider, and provides a voice messaging solution for end users that is integrated on the same server. SpeechFarm is not limited to a specific application; it is a general architecture to enable any type of speech service over IP networks for clients of other services.
6. Internet products such as that from Hearme.com that enable real-time voice communication over the Internet. The service is limited to synchronous client-to-client spoken communication. It does not provide persistent storage of speech recordings or speech processing.

Unlike these existing solutions, SpeechFarm may provide a purely over-the-Internet, client-server, scalable and flexible speech services. New applications can easily exploit speech services provided by SpeechFarm with minimal engineering effort.

Figure 2:
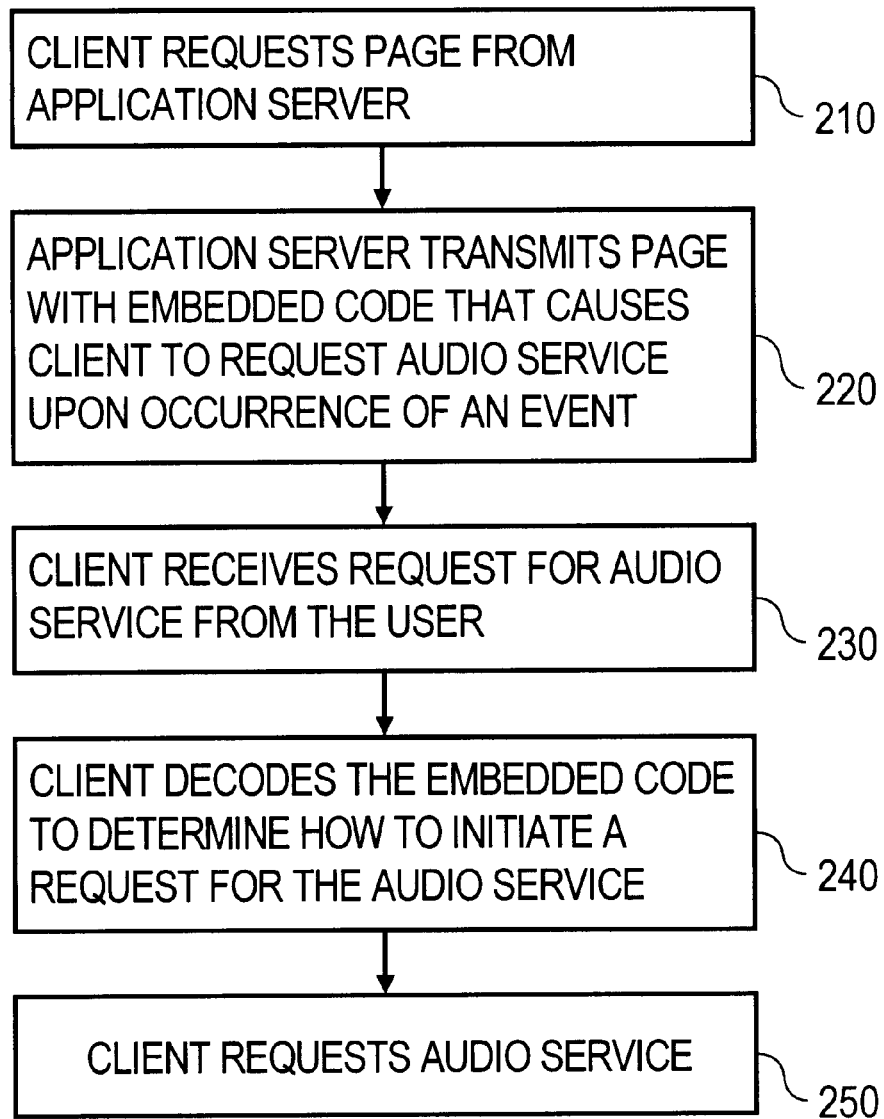
FIG. 2 is an flowchart depicting an expository process in which a SpeechFarm, application service, and a client cooperate to provide speech functionality.

Providing Digital Speech Service to a Client on Behalf of a Service Provider In order for SpeechFarm 120 to provide digital speech services to a client on behalf of a service provider, a mechanism is needed that causes a client and the application server 112 to interact for the purposes of providing the desired speech service. FIG. 2 is an example of a process that causes a client and the SpeechFarm 120 to interact. The steps are illustrated using the components shown in exemplary network architecture 100.

Referring to FIG. 2, at step 210, client 114 transmits a request for a page over the Internet to application server 112. At step 220, application server 112-1 transmits the page. The page contains embedded code and parameters. The embedded parameters include: (1) an application service ID that uniquely identifies the application service. This unique application service ID is generated by a SpeechFarm administrative service. The application service ID is used for administrative purposes such as billing the application service provider for usage of SpeechFarm services; (2) a data ID that uniquely identifies a SpeechFarm service request for a given application service. The data ID needs to be unique within the scope of an application service. The code, when decoded by a browser on a client, causes the client 114 to request a speech service from application server 112-1 upon the occurrence of a certain event or the satisfaction of certain conditions. For example, the page may contain HTML, Java, and JavaScript code that defines the GUI. The GUI contains graphical controls, such as a record button, that may be selected by the user using a mouse. When the record button is selected by the user, SpeechFarm libraries running on the client cause the client to connect and interact with the SpeechFarm server 120.

At step 230, client 114 receives a request for a speech service. In this example, the user requests a speech service by clicking on the record button.

At step 240, client 114 decodes the message generated by the record button. In the process of decoding the record message, the browser determines where to initiate a request for the speech service specified by the URL, and determines what parameters to transmit to the speech service specified by a URL.

At step 250, client 114 transmits a request for the speech service to the SpeechFarm 120.

Hardware Overview

Figure 3:
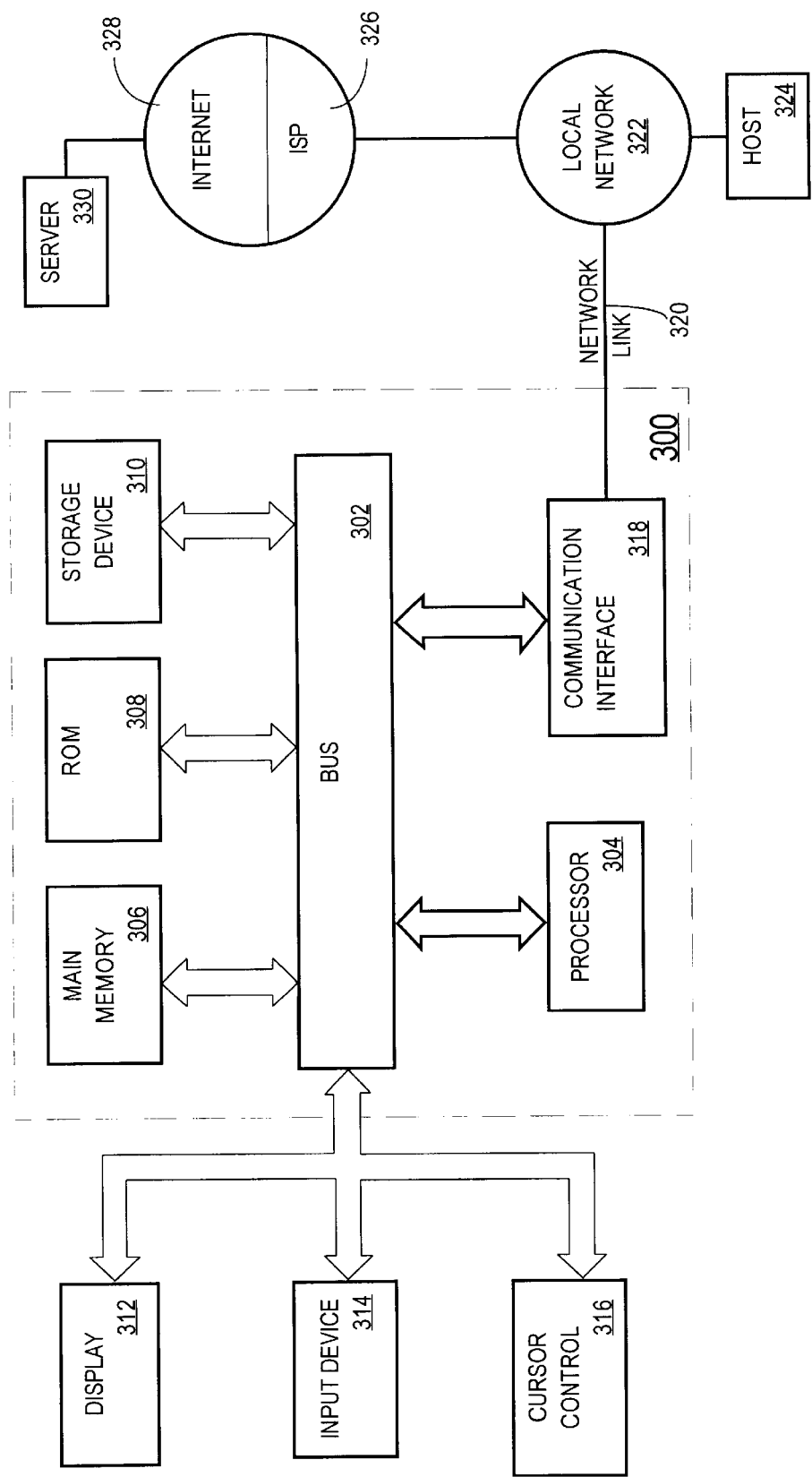
FIG. 3 is a block diagram depicting a computer system which is used in an embodiment of the present invention.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are implemented by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application implements the techniques described herein.

The received code may be executed by processor 304 as it is received, and/or stored in storage device 310, or other non-volatile storage for later execution. In this manner, computer system 300 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of managing speech processing over a network the method comprising the steps of:

maintaining on a first set of servers a set of speech services for processing digital speech data originated by clients of a second set of servers that are associated with a plurality service providers, wherein said first set of servers includes a first server and zero or more other servers;

said first server receiving from a client a request for a speech service of said set of speech services for processing digital speech data;

wherein said request is generated by said client in response to interaction with data received by said client from a second server of said second set of servers;

wherein said data is traismitted by said second server from a first network address;

wherein said first set of servers does not include said second server;

providing said requested speech service to said client in response to receiving said request for said speech service;

wherein said request is received by said first server without any intervention by the second set of servers in the communication of the request from the client to the first server;

wherein providing said requested speech service includes participation in establishing a connection from the client to a second network address of the first server, said second network address being different than said first network address; and wherein said first server and said second server reside on different computers.

2. The method of claim 1, wherein:

said digital speech data includes a set of speech recordings of a user;

each speech recording of said set of speech recordings originated from a client of a particular server of said second set of servers; and the method further includes the step generating data in a database that establishes an association between said each speech recording and said particular server.

3. The method of claim 1, wherein:

said second server is associated with a particular service provider;

said request is a request to:
generate digital speech data by recording sound at said client, and
transmit said digital speech data to a particular server of said first set of servers; and the step of providing said requested speech service includes receiving said digital speech data generated by recording sound at said client to said particular server of said first set of servers.

4. The method of claim 1, wherein said speech service is a speech service for generating digital speech data by recording, at said client, a voice of a user.

5. The method of claim 1, wherein said requested speech service is a service for authenticating a user based on a recording of a voice.

6. The method of claim 1, wherein said requested speech service is a service for identifying the one of either the age or gender of a user based on digital speech data generated from a voice.

7. The method of claim 1, wherein said data received by said client from a second server includes data embedded in a page, wherein said data embedded in a page conforms to HTML.

8. The method of claim 1, wherein said data received by said client from a second server is received from said second server over a public network, wherein said first server receiving from a client a request for a speech service includes said first server receiving said request over said public network.

9. The method of claim 8, wherein said public network is the Internet.

10. The method of claim 2, further including the step of transmitting administrative data describing a particular speech recording to said second server.

11. The method of claim 1, further including the step of said first server transmitting derivative data derived from said digital speech data originated by clients of a second set of servers.

12. The method of claim 11, wherein said derivative data is word data.

13. A computer-readable medium carrying one or more sequences of one or more instructions for managing speech processing over a network, the one or more sequences of one or more instructions including instructions which when executed by one or more processors, cause the one or more processors to perform the steps of:

maintaining on a first set of servers a set of speech services for processing digital speech data originated by clients of a second set of servers that are associated with a plurality service providers, wherein said first set of servers includes a first server and zero or more other servers;

said first server receiving from a client a request for a speech service of said set of speech services for processing digital speech data;

wherein said request is generated by said client in response to interaction with data received by said client from a second server of said second set of servers;

wherein said data is transmitted by said second server from a first network address;

wherein said first set of servers does not include said second server;

providing said requested speech service to said client in response to receiving said request for said speech service;

wherein said request is received by said first server without any intervention by the second set of servers in the communication of the request from the client to the first server;

wherein providing said requested speech service includes participating in establishing a connection from the client to a second network address of the first server, said second network address being different than said first network address; and wherein said first server and said second server reside on different computer.

14. The computer-readable medium of claim 13, wherein:

said digital speech data includes a set of speech recordings of a user;

each speech recording of said set of speech recordings originated from a client of a particular server of said second set of servers; and the one or more sequences include one or more instructions for generating data in a database that establishes an association between said each speech recording and said particular server.

15. The computer-readable medium of claim 13, wherein:

said second server is associated with a particular service provider;

said request is a request to:
generate digital speech data by recording sound at said client, and
transmit said digital speech data to a particular server of said first set of servers; and the step of providing said requested speech service includes receiving said digital speech data generated by recording sound at said client to said particular server of said first set of servers.

16. The computer-readable medium of claim 13, wherein said speech service is a speech service for generating digital speech data by recording, at said client, a voice of a user.

17. The computer-readable medium of claim 13, wherein said requested speech service is a service for authenticating a user based on a recording of a voice.

18. The computer-readable medium of claim 13, wherein said requested speech service is a service for identifying the one of either the age or gender of a user based on digital speech data generated from a voice.

19. The computer-readable medium of claim 13, wherein said data received by said client from a second server includes data embedded in a page, wherein said data embedded in a page conforms to HTML.

20. The computer-readable medium of claim 13, wherein said data received by said client from a second server is received from said second server over a public network, wherein said first server receiving from a client a request for a speech service includes said first server receiving said request over said public network.

21. The computer-readable medium of claim 20, wherein said public network is the Internet.

22. The computer-readable medium of claim 14, wherein the one or more sequences include one or more instructions for transmitting administrative data describing a particular speech recording to said second server.

23. The computer-readable medium of claim 13, wherein the one or more sequences include one or more instructions for the first server transmitting derivative data derived from said digital speech data originated by clients of a second set of servers.

24. The computer-readable medium of claim 23, wherein said derivative data is word data.

25. The method of claim 1, wherein said data received by said client over said network from a second server includes an ID identifying said speech service.

26. The method of claim 1, the steps further including the step of a browser on said client causing said client to execute one or more software modules that participate in providing said requested speech service to said client.

27. The method of claim 26, the steps further including executing said one or more software modules to record second digital speech data.

28. The method of claim 26, the steps further including executing said one or more software modules to playback second digital speech data.

29. The method of claim 26, the steps further including executing said one or more software modules to provide up-streaming of second digital speech data.

30. The method of claim 26, the steps further including executing said one or more software modules to provide down-streaming of second digital speech data.

31. The method of claim 26, the steps further including executing said one or more software modules to provide client-side caching of second digital speech data.

32. The computer-readable medium of claim 13, wherein said data received by said client over said network from a second server includes an ID identifying said speech service.

33. The computer-readable medium of claim 13, the steps further including the step of a browser on said client causing said client to execute one or more software modules that participate in providing said requested speech service to said client.

34. The computer-readable medium of claim 33, the steps further including executing said one or more software modules to record second digital speech data.

35. The computer-readable medium of claim 33, the steps the steps further including executing said one or more software modules to playback second digital speech data.

36. The computer-readable medium of claim 33, the steps further including executing said one or more software modules to provide up-streaming of second digital speech data.

37. The computer-readable medium of claim 33, the steps further including executing said one or more software modules to provide down-streaming of second digital speech data.

38. The computer-readable medium of claim 33, the steps further including executing said one or more software modules to provide client-side caching of second digital speech data.

39. The method of claim 1, wherein said digital speech data is communicated by said client to said first server without intervention by said second set of servers in the communication of said digital speech data by said client.

40. The computer-readable medium of claim 13, wherein said digital speech data is communicated by said client to said first server without intervention by said second set of servers in the communication of said digital speech data by said client.

41. The method of claim 1, wherein:
the second server requires user input from said client;
the step of providing said requested speech service to said client in response to receiving said request for said speech service includes generating particular data from digital speech data received from said client;
wherein said digital speech data is communicated by said client via said connection to said first server without intervention by said second set of servers in the communication of said digital speech data by said client; and
the steps further include the first server providing said particular data to said second server as said user input.

42. The computer-readable medium of claim 13, wherein:
the second server requires user input from said client;
the step of providing said requested speech service to said client in response to receiving said request for said speech service includes generating particular data from digital speech data received from said client;
wherein said digital speech data is communicated by said client via said connection to said fist server without intervention by said second set of servers in the communication of said digital speech data by said client; and
the steps further include the first server providing said particular data to said second server as said user input.

43. The method of claim 1, wherein said first computer and said second computer are connected to a public network via different local area networks.

44. The computer-readable medium of claim 13, wherein said first computer and said second computer are connected to a public network via different local area networks.

* * * * *

UNITED STATES PATENT AND TRADEMARK OFFICE
CERTIFICATE OF CORRECTION

PATENT NO.    : 6,760,697 B1
DATED         : July 6, 2004
INVENTOR(S)   : Leonardo Neumeyer et al.

It is certified that error appears in the above-identified patent and that said Letters Patent is hereby corrected as shown below:

Column 10,
Line 63, replace "traismitted" with -- transmitted --;

Column 11,
Line 9, replace "participation" with -- participating --;

Column 12,
Line 38, replace "computer" with -- computers --;

Column 14,
Line 47, replace "fist" with -- first --.

Signed and Sealed this

Twenty-eighth Day of September, 2004

JON W. DUDAS
*Director of the United States Patent and Trademark Office*